(12) United States Patent
Welding et al.

(10) Patent No.: US 6,269,868 B1
(45) Date of Patent: Aug. 7, 2001

(54) HEAT EXCHANGER WITH VARIABLE COMPRESSION SIDE SUPPORT

(75) Inventors: Chad Richard Welding, Canton; Rodger Alan Lisk, Dearborn; William Wellington Dinnan, III, Farmington Hills, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/346,534

(22) Filed: Jul. 2, 1999

(51) Int. Cl.[7] .................................................. F28D 1/00
(52) U.S. Cl. ............................ 165/149; 165/81; 165/82
(58) Field of Search ............................ 165/149, 81, 82, 165/153, 148, 178, 173, 175

(56) References Cited

U.S. PATENT DOCUMENTS

| | | |
|---|---|---|
| 2,327,491 * | 8/1943 | Blair ...................................... 165/149 |
| 3,627,035 * | 12/1971 | Astrup .............................. 165/149 X |
| 3,795,274 | 3/1974 | Fieni . |
| 3,894,580 | 7/1975 | Chartet . |
| 3,941,293 | 3/1976 | Chartet . |
| 4,230,176 | 10/1980 | Crews . |
| 4,700,469 | 10/1987 | Kroetsch et al. . |
| 5,165,163 | 11/1992 | Pardi . |
| 5,186,239 * | 2/1993 | Young et al. .................... 165/149 X |
| 5,450,997 | 9/1995 | Turak et al. . |

FOREIGN PATENT DOCUMENTS

| | | | |
|---|---|---|---|
| 2270543 * | 1/1976 | (FR) ...................................... 165/149 |
| 1423854 * | 2/1976 | (GB) ...................................... 165/149 |
| 57-52797 | 3/1982 | (JP) . |

* cited by examiner

Primary Examiner—Christopher Atkinson
(74) Attorney, Agent, or Firm—Larry I. Shelton

(57) ABSTRACT

A heat exchanger having a side support with a variable compression tab member is disclosed. The tab member engages a brazing fixture used in manufacturing the core and prevents damage to the fins of the core form the brazing fixture.

10 Claims, 2 Drawing Sheets

HEAT EXCHANGER WITH VARIABLE COMPRESSION SIDE SUPPORT

BACKGROUND OF THE INVENTION

1. Field of the Invention

The present invention relates generally to a heat exchanger for an automotive vehicle. More particularly, the present invention relates to an automotive heat exchanger core having a side support which prevents fin damage during the assembly operation.

2. Disclosure Information

Typical automotive heat exchangers, such as radiators, include a plurality of thin-walled tubes interleaved with corrugated fins enclosed in a core frame. The fins are rigidly attached to the tubes as well as to a pair of frame side supports while the tubes are joined to a pair of headers. The frame side supports are attached also to the headers. As is well known in the art, coolant passes from one header through the tubing to the other header. As the temperature of the coolant passing through the heat exchanger core increases, the core expands.

Heat exchanger cores are manufactured by assembling the plurality of tubes interleaved with fins between the pair of side support members. The core is precompressed by a variety of known methods prior to brazing to maintain the tube and fins in proper relationship. One known method is to precompress the core with one or more steel bands completely surrounding the core before brazing. After banding, the core is inserted into a furnace and heated until it brazes together. After brazing, the steel bands are cut from the core and discarded or reused. In addition, these bands often distort and/or skew the core which can result in leaks and/or improper vehicle fit.

Other types of brazing fixtures have been proposed such as that shown in U.S. Pat. No. 5,165,163, assigned to the assignee of the present invention. The brazing fixture includes a plurality of brazing stations each having a pivotal lever which applies a compressive force against one of the side support members of the heat exchanger while the other side support member is held stationary in the fixture. However, these fixtures tend to become corroded in the brazing atmosphere, reducing the effectiveness of the compressive force applied against the core. Also, these fixtures usually are not used upstream of the braze process due to sheer weight and mass. Heating these fixtures in a braze furnace requires much energy due to their large mass. This adds expense and delay to the manufacturing process.

A third type of brazing fixturing is proposed in U.S. Pat. No. 3,894,580. In this fixture, a pair of generally parallel ties extend between each of the side support members to fix the core in a predetermined position prior to the brazing operation. The disadvantages of using the generally parallel ties is that unless an elaborate and complicated clamping mechanism, such as shown in U.S. Pat. No. 3,894,580 is utilized on each end of the ties, the heat exchanger core can still skew as a result of normal process handling and/or shrinkage and thermal cycling during the brazing operation. This skewing or misalignment of the heat exchanger core often results in deleterious effects upon the core such as leaking and/or improper vehicle fit.

U.S. Pat. No. 5,450,997, also assigned to the assignee of the present invention, overcomes the problems associated with some prior art brazing fixtures by providing a pair of rod members which engage the side support members of the heat exchanger. The rod members are diagonally placed into holes in the side support members of the heat exchanger, such as a radiator, to prevent skewing. This is shown in FIGS. 1A and B. As shown, the rod members 10 engage the side support members 12 to provide a compressive force to the core 14. A fin member 16 is always placed adjacent the side support members 12. Because of manufacturing variations, the rod members may be slight too short or too long when placed in the side supports 12. As illustrated in FIG. 1B, if the rod members 10 are too short, damage to the fin members 16, such as crushing, is possible because the fin members are manufactured from very light gage material. The heat exchanger core must then be scrapped, resulting in waste of material, time and labor.

It would, therefore, be advantageous to provide an effective method for preventing fin damage in a heat exchanger core during a manufacturing process.

SUMMARY OF THE INVENTION

The present invention overcomes the disadvantages of the prior art by providing a heat exchanger for an automotive vehicle, comprising a pair of headers, a plurality of generally elongate, fluid carrying tubes having opposite ends connected to each of the headers and defining air paths between adjacent pairs thereof, and a plurality of fin members provided in the air paths. The heat exchanger further comprises a pair of channel-shaped side supports disposed between the headers at opposite ends of the headers. The side supports are aligned generally parallel to the longitudinal axis of the tubes and immediately adjacent the fin members so as to be in contact with the outermost fins. Each of the side supports has a generally planar web portion and a pair of flanges extending generally perpendicularly to the plane of the web portion. At least one of the side supports includes an elastically deformable tab member depending away from the plane of the web portion. The tab member is configured to engage a brazing fixture applied to the heat exchanger and provide a resistive force against the braze fixture.

In one embodiment, the tab member is secured to the web portion by a living hinge at one end and includes a free end extending below the plane of the web portion at a second end. In this embodiment, the tab member extends below the plane of the web portion by a distance equal to two to three times the thickness of the tab member.

It is an advantage of the present invention that the precompression of the core during assembly will not damage the fins, resulting in less scrap. It is a further advantage the tab members may be simply added to the side supports without complex tooling changes.

These and other objects, features and advantages of the present invention will become apparent from the following drawings, detailed description, and claims which follow.

DETAILED DESCRIPTION OF THE PREFERRED EMBODIMENTS

Figure 1A:
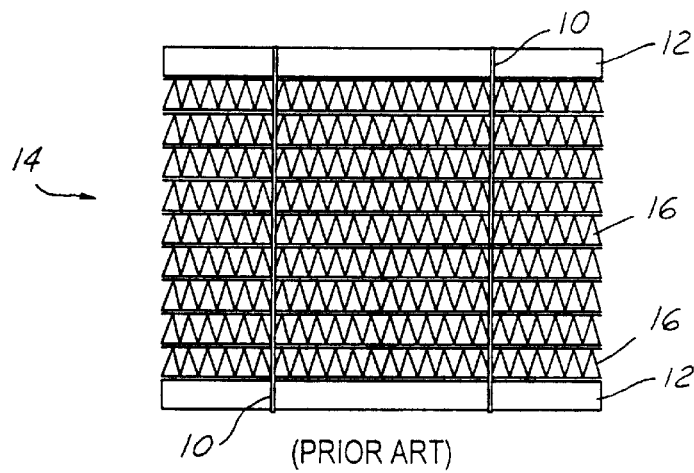
FIGS. 1A and 1B are elevational views of a prior art heat exchanger ore side support member.
Figure 1B:
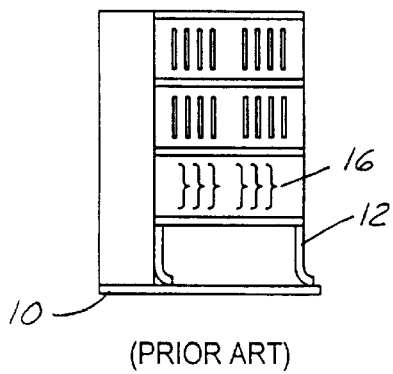
Figure 2:
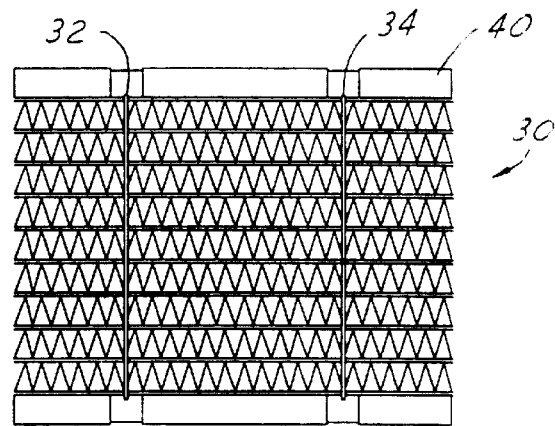
FIG. 2 is an elevational view of a heat exchanger core having a side support structured in accord with the principles of the present invention.

Referring now to the drawings, FIG. 2 shows a heat exchanger, such as a heater core or radiator core 30, held by two clamps 32, 34. The core 30 includes a plurality of interleaved tubes 36 and fins 38 disposed between a pair of side supports 40. Fluid manifolds or tanks (not shown) are secured in fluid communication to the tubes 36 in known fashion. The core 30 shown in FIG. 2 is ready for brazing. The clamps 32, 34 engage the side supports 40 to provide a compressive force to hold the core together during the brazing process. After brazing, the clamps 32, 34 are removed and the core is fully brazed. It should also be apparent to those skilled in the art that the coefficient of thermal expansion of the clamps 32, 34 must be different, or less than the coefficient of thermal expansion of the plurality of interleaved tubes and fins of the heater core 30, so that a compressive force can be maintained against the core by the clamps to hold the core in its predetermined position during the brazing process.

Figure 3:
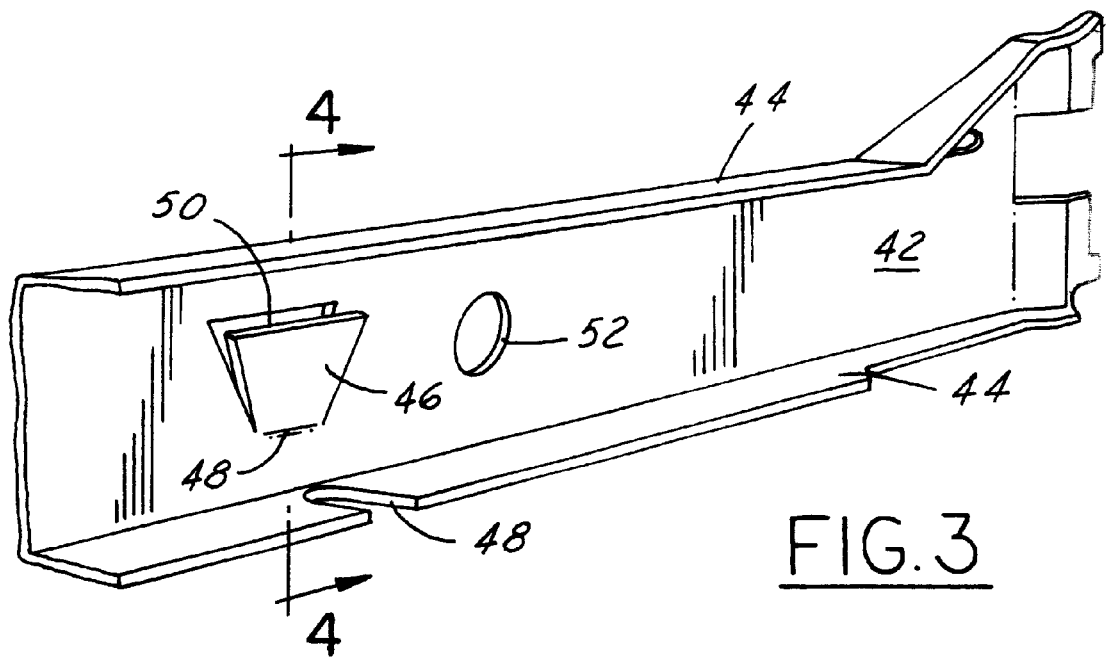
FIG. 3 is a perspective view of a side support member of the present invention.
Figure 4:
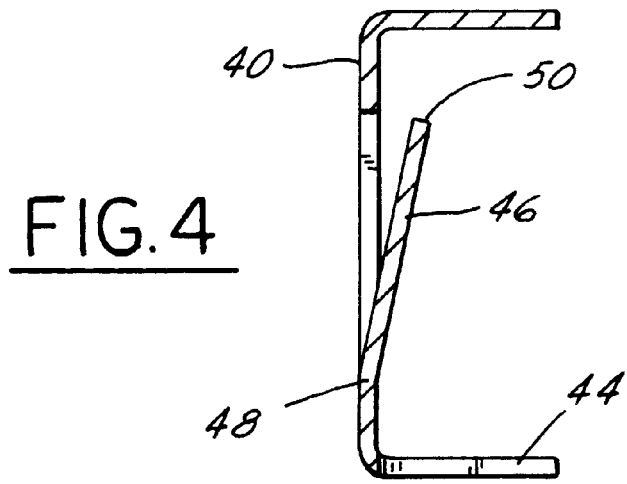
FIG. 4 is a cross-sectional view of the side support of FIG. 3, taken along line 4—4.

FIGS. 3 and 4 show perspective and cross-sectional views of side supports 40 of the present invention. The side support 40 comprises a U-shaped channel member having a base portion 42 (also referenced as a web portion, and a pair of flanges 44 extending generally perpendicularly to the plane of the base portion 42. One of the side supports 40 also includes an elastically deformable tab member 46 depending away from the plane of the base portion 42. The tab 46 is disposed medially or equidistantly from each flange 44 in the base portion 42. A slot 48, or hole is formed in the flange 44 adjacent the tab member 46. In operation, the clamp 34 is placed into the slot 48 so that it contacts the tab member 46.

As shown in FIG. 4, the tab member 46 is secured to the base portion 42 at a living hinge 48. The tab member 46 has a tapering shape such that its free end 50 is wider than the end at the living hinge. This provides for maximum contact area for the clamp member to engage after the clamp is inserted into the slot 48. The tapering configuration also allows for easy removal of the clamp after brazing. The tapering provides that the clamp 34 does not become wedged between the tab 46 and the flange 44. In the preferred embodiment, the tab 46 is stamped into the base portion 42 of the side support 40. The free end 50 of the tab 46 depends away from the plane of the base portion 42 by a distance approximately equal to at least one and one-half times its thickness. It has been found that a distance of three times the thickness is optimal for an aluminum side support. This distance provides for enough deflection to prevent fin damage when the clamp 34 engages with the side support, and also provides sufficient fin-to-side support contact to braze the fin sufficiently to the side support to get the required heat transfer.

Figure 5:
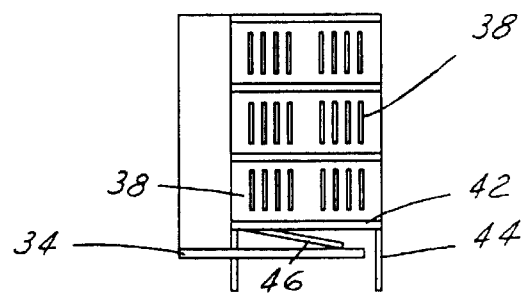
FIG. 5 is an elevational, enlarged perspective view of a heat exchanger core precompressed prior to a brazing operation.

FIG. 5 shows an elevational view of the core with the clamp 34 engaging the tab member 46. Because of the living hinge, the tab member is able to resist the force of the clamp and fin damage does not occur. Because the variations and tolerance differences during manufacturing of multiple cores, the tab member 46 provides variable compression. Some cores may not need the tab because the clamp engages the side support according to design requirements. Other cores may be slightly of out tolerance and the tab is engaged minimally. Still other cores may be over-engaged by the clamp, either because the clamp has been altered or the core is out of tolerance. The clamp will engage the tabs on these cores and still provide a variable resistive force to prevent fin damage. Stated another way, the tab member 46 elastically deforms under the load of the clamp 34 to prevent damage to the fins as well as to the side support.

It should be readily apparent to those skilled in the art that various modification and alterations of the present invention are readily available without departing from the spirit and scope of the present invention. For example, the side support may include a thermal stress relieving zone 52 to account for the thermal cycling of the core in use. Also, the side supports may be formed from a variety of materials. The tab members may be coated with different materials, such as ceramics, to prevent sticking or brazing of the clamp to the core. Each side support member can have a tab member. Accordingly, it is the following claims, including all equivalents, which determine the scope of the invention.

What is claimed is:

1. A heat exchanger for an automotive vehicle, comprising:
    a plurality of generally elongate, fluid carrying tubes defining air paths between adjacent pairs thereof;
    a plurality of fin members provided in the air paths; and
    a pair of channel-shaped side supports disposed generally parallel to the longitudinal axis of said tubes and immediately adjacent said fin members so as to be in contact therewith;
    each of said side supports having a generally planar web portion and a pair of flanges extending generally perpendicularly to the plane of said web portion, at least one of said side supports including an elastically deformable tab member depending away from the plane of said web portion at an angle less than ninety degrees.

2. A heat exchanger according to claim 1, wherein member is secured to said web portion by a living hinge at one end and has a free end extending below the plane of said web portion at a second end.

3. A heat exchanger according to claim 2, wherein member is generally tapered and has a first width at said living hinge and a second width greater than said first width a predetermined distance from said hinge.

4. A heat exchanger according to claim 2, wherein member has a predetermined gage and said second end of said tab extends below the plane of said web portion by a distance equal to at least twice the gage of the tab member.

5. A heat exchanger according to claim 1, wherein is disposed medially in said web portion, equidistant between said flange so as to provide a contact area with said fin member.

6. A heat exchanger according to claim 1, wherein said side supports further include a thermal stress relieving zone therein.

7. A heat exchanger according to claim 1, wherein each of said side supports includes a tab member.

8. A heat exchanger for an automotive vehicle, comprising:
    a plurality of generally elongate, fluid carrying tubes defining air paths between adjacent pairs thereof;
    a plurality of fin members provided in the air paths; and
    a pair of channel-shaped side supports disposed generally parallel to the longitudinal axis of said tubes and immediately adjacent said fin members so as to be in contact therewith,
    each of said side supports having a generally planar web portion and a pair of flanges extending generally perpendicularly to the plane of said web portion, each of said side supports including an elastically deformable tab member depending away from the plane of said web portion at an angle less than ninety degrees, said tab member being secured to said web portion by a living hinge at one end and having a free end extending below the plane of said web portion at a second end by a distance equal to at least twice the gage of the tab member.

9. A heat exchanger according to claim 8, wherein said tab is generally tapered and has a first width at said living hinge and a second width greater than said first width a predetermined distance from said hinge.

10. A heat exchanger according to claim 9, wherein said tab is disposed medially in said web portion, equidistant between said flange so as to provide a contact area with said fin member.

\* \* \* \* \*